United States Patent

Goldmacher et al.

[11] 3,925,236
[45] Dec. 9, 1975

[54] ELECTRO-OPTIC COMPOSITIONS AND DEVICE

[75] Inventors: Joel Edward Goldmacher; Michael Thomas McCaffrey, both of Cranbury, N.J.

[73] Assignee: RCA Corporation, New York, N.Y.

[22] Filed: June 22, 1973

[21] Appl. No.: 372,649

Related U.S. Application Data

[63] Continuation of Ser. No. 240,819, April 3, 1972, abandoned, which is a continuation-in-part of Ser. No. 829,649, June 2, 1969, abandoned.

[52] U.S. Cl. ...... 252/299; 252/408 LC; 260/566 R; 260/566 F; 260/471 R; 260/473 R; 350/160 LC
[51] Int. Cl.².. C09K 3/34; C09K 3/00; G02B 5/23; G02F 1/01
[58] Field of Search.............. 252/408 LC, 299; 350/160 LC

[56] References Cited
UNITED STATES PATENTS

| | | | |
|---|---|---|---|
| 3,540,796 | 11/1970 | Goldmacher et al. | 252/408 |
| 3,738,942 | 6/1973 | Matsumoto et al. | 252/299 |
| 3,819,531 | 6/1974 | Saeva et al. | 252/408 |
| 3,826,757 | 7/1974 | Wong | 252/408 |

FOREIGN PATENTS OR APPLICATIONS

| | | | |
|---|---|---|---|
| 2,026,280 | 12/1970 | Germany | 252/408 |
| 751,293 | 11/1970 | Belgium | 252/408 |

Primary Examiner—Benjamin R. Padgett
Assistant Examiner—T. S. Gron
Attorney, Agent, or Firm—Glenn H. Bruestle; Birgit E. Morris

[57] ABSTRACT

Para-alkoxybenzylidene-p'-aminophenylalkanoate compounds of the formula

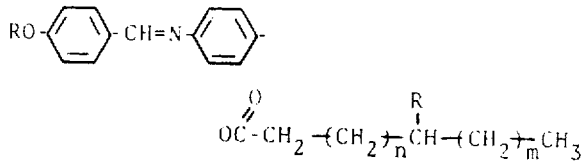

wherein R at each occurrence is a normal alkyl radical and n and m are integers from 0 to 5 are nematic liquid crystals. These compounds, when incorporated alone or in admixture with other p-alkoxybenzylidene-p'-aminophenyl substituted compounds in an electro-optic device comprising a thin layer of the liquid crystal between conductive support plates, impart longer life to said device than known liquid crystals.

10 Claims, 2 Drawing Figures

INVENTORS
Joel Edward Goldmacher and
Michael Thomas McCaffrey

BY
ATTORNEY

ELECTRO-OPTIC COMPOSITIONS AND DEVICE

This application is a continuation of application Ser. No. 240,819 filed Apr. 3, 1972, now abandoned, which is a continuation-in-part of application Ser. No. 829,649 filed June 2, 1969, now abandoned.

BACKGROUND OF THE INVENTION

This invention relates to novel liquid crystal compositions and improved electro-optic devices containing these novel compositions.

Nematic liquid crystals are described in copending application entitled, "Electro-Optical Compositions and Devices," Ser. No. 627,451, filed Mar. 31, 1967 by Joel E. Goldmacher and Joseph A. Castellano, now U.S. Pat. No. 3,540,796. The liquid crystal compositions described therein are Schiff bases having the general formula

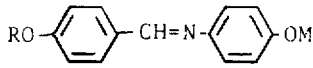

wherein OR and OM are either normal alkoxy radicals or normal acyloxy radicals such that when OR is an alkoxy radical, OM is an acyloxy radical, and vice versa. Thin layers of such nematic liquid crystals, when in an unexcited state, that is, there is no electric current therein, are relatively transparent to light, and when in an excited state, that is, with an electric current therein, scatter light. A current is caused to flow in the liquid crystal by applying a voltage across the liquid crystal which is located between two conducting elements. The light scattering effect obtained in the aforementioned prior art liquid crystal compositions, as well as in the novel compositions disclosed herein, is due to the effect of turbulence of liquid crystal domains. This effect is termed dynamic scattering.

The scattering exhibited by liquid crystals may be employed in reflective, absorptive and transmissive flat panel displays, in light shutters and other electro-optic applications.

An important aspect in any commercial device is the lifetime of the device. The lifetimes of liquid crystal electro-optic devices are affected by degradation of the liquid crystal compositions of the devices. It would therefore be advantageous to obtain a device having a liquid crystal composition in which degradation within the device is substantially reduced as compared to that of the prior art compositions. In this way, devices can be made having improved lifetimes as compared with prior art devices.

SUMMARY OF THE INVENTION

The novel p-alkoxybenzylidene-p'-aminophenylalkanoate compounds of the invention are represented by the general formula

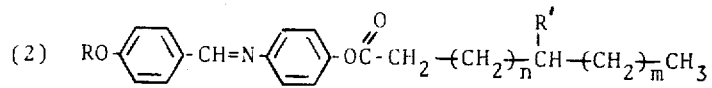

wherein R is a normal alkyl group of 1–8 carbon atoms, R is a normal alkyl of 1–6 carbon atoms, and $n$ and $m$ are integers from 0–5 with the proviso that the acyloxy group contains up to 10 carbon atoms. Preferably R and R alkyl of 1–3 carbon atoms. These compounds possess a liquid crystal state.

Nematic liquid crystal compositions of the invention include p-alkoxybenzylidene-p'-aminophenylalkanoates as defined hereinabove and mixtures thereof, as well as mixtures of said p-alkoxybenzylidene-p'-aminophenylalkanoates with other p-alkoxybenzylidene-p'-aminophenyl-substituted compounds, as hereinafter described, which do not themselves possess a liquid crystal state.

The improved electro-optic devices of the invention comprise a layer of a nematic liquid crystal composition containing at least one member of the group represented by the above general formula (2) and means for applying an electric field thereto.

DETAILED DESCRIPTION OF THE INVENTION

Figure 2:
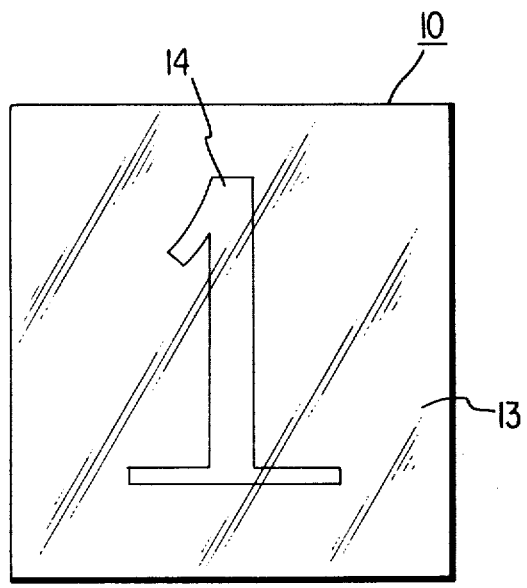
FIGS. 1 and 2 are side and front views respectively of a simple electro-optical light valve embodying the invention.
Figure 1:
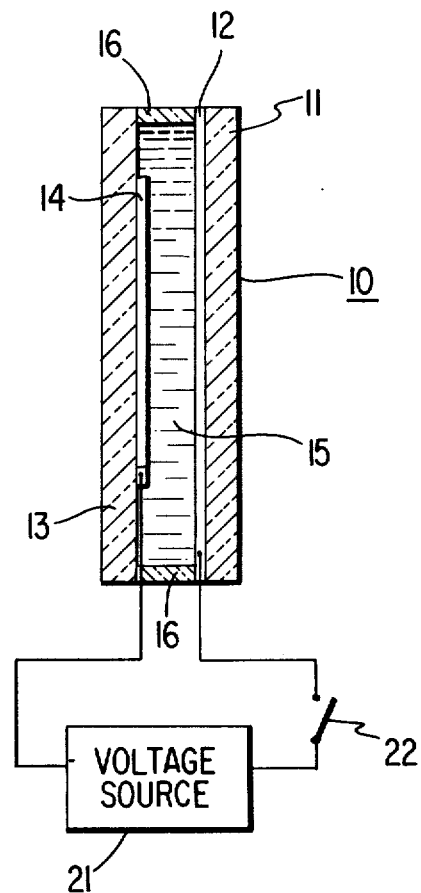

Illustrative of liquid crystals of the invention as set forth in formula (2) are p-methoxybenzylidene-p'-aminophenyl-3 methylbutanoate, p-methoxybenzylidene-p'-aminophenyl-3-methylpentanoate, p-methoxybenzylidene-p'-aminophenyl-4-methylpentanoate, p-methoxybenzylidene-p'-aminophenyl-3-methylhexanoate, p-methoxybenzylidene-p'-aminophenyl-5-methylhexanoate, p-ethoxybenxylidene-p'-aminophenyl-3-methylpentanoate, p-propoxybenzylidene-p'-aminophenyl-3-methylpentanoate, p-heptoxybenzylidene-p'-aminophenyl-3-n-butylbutanoate, p-octoxybenzylidene-p'-aminophenyl-3-ethylpentanoate and the like.

These compounds can be prepared by reacting a p-alkoxybenzylidene-p'-aminophenol with the corresponding branched-chain carboxylic acid anhydride in pyridine in known manner. The p-alkoxybenzylidene-p'-aminophenylalkanoate product can be recrystallized in known manner from a suitable solvent.

The above described p-alkoxybenzylidene-p'amino phenylalkanoates can be employed in electro-optic devices alone, or mixtures of such compounds can also be employed. In addition, mixtures of the compounds of the invention with other branched chain p-alkoxybenzylidene-p'-aminophenylalkanoates which do not themselves have liquid crystal properties can also be employed. Illustrative of the latter compounds are compounds having a branched chain on an alpha carbon atom, such as p-methoxybenzylidene-p'-aminophenyl-2-methylpropanoate, p-methoxybenzylidene-p'-aminophenyl-2-methylpentanoate and the like; compounds containing more than one branch on the acyloxy chain, such as p-methoxybenzylidene-p'-aminophenyl-3,7-dimethyloctanoate, p-methoxybenzylidene-p'-aminophenyl-3,5,5-trimethylhexanoate and the like; or compounds containing more than one acyloxy group, such as p-methoxybenzylidene-p'-aminophenyl-(5-acetoxy)-4-methylpentanoate and the like.

The embodiment shown in the FIGURES is a simple numerical indicator 10. The indicator comprises a back support plate 11 having a continuous specularly reflecting conductive coating 12 on one surface thereof, a front support plate 13 having a transparent conductive coating 14 on one surface thereof and a liquid crystal composition of the invention 15 between said conductive coatings or electrodes 12 and 14 respectively. The transparent conductive electrode 14 on the front support plate 13 is made in the shape of the pattern desired to be shown by the device, for example, in the shape of the numeral 1. The specularly reflecting electrode 12 may be made, for example, of vacuum evaporated aluminum. The transparent conductive electrode 14 may be a tin oxide coating. The thickness of the liquid crystal layer 15 is preferably between about ¼ to ½ mil. The edges of the device are preferably sealed with a thermoplastic sealing agent 16.

In operation of the device, the transparent electrode and the reflective electrode are connected to a voltage source 21. This voltage source may be either A.C. or D.C. For longest device life, A.C. operation is preferred. When ambient light is incident upon the device in its off-state, no pattern is visible to an observer looking at the device from the front side thereof. A voltage is applied by means of voltage source 21 connected across the liquid crystal composition 15 and through a switch 22 so as to cause the liquid crystal composition 15 to scatter light in the region between the electrodes 12 and 14 when switch 22 is closed. This causes the observer to see a bright pattern which is the same as the pattern of the transparent electrode 14.

The above-illustrated device is just one of many embodiments of the invention. For example, a reflective electrode is optional and both electrodes may be transparent. In such cases, the device will generally operate in a transmissive mode, that is, with a light source on the side of the device opposite that of the observer. Also, it is possible to include row and column conductors for exciting selected areas of the liquid crystal device.

The use of the compounds of the invention, containing particular branched-chain acyloxy groups, in electrooptic devices increase the lifetime of said devices by as much as an order of magnitude.

It is believed that the lifetime of prior art devices was limited due to the reactivity of the normally labile oxygen of the straight chain acyloxy group of the prior art compositions. It is hypothesized that this labile oxygen of the straight chain acyloxy groups reacted with hydroxyl groups causing decomposition of the liquid crystal compound.

In the novel compounds disclosed herein, the reactivity of the labile oxygen is believed to be reduced due to steric hindrance provided by the branched functions of the novel compounds. For greatest steric hindrance, it is preferred that these branched chains extend from the carbon atoms close to the carbon atom containing the labile oxygen, particularly the beta carbon of the acyloxy group.

In operation, the electro-optic device is heated to a temperature so as to bring the liquid crystal composition of the device to its mesomorphic or liquid crystalline state. It is therefore preferable to use liquid crystal compositions exhibiting mesomorphic behavior as close to room temperature as possible. Generally, the novel compounds having the lowest crystal-nematic transition temperatures are those wherein the alkoxy group is a methoxy group.

The use of mixtures of a p-alkoxybenzylidene-p'-aminophenylalkanoates also serves to lower the crystal-nematic transition temperatures.

The invention will be further illustrated by the following examples, but it is to be understood that the invention is not meant to be limited to the details described therein. In the examples, parts are by weight unless otherwise noted.

EXAMPLE 1

A solution of 54.5 parts of p-aminophenol, 68.0 parts of anisaldehyde and 0.1 part of benzenesulfonic acid in 200 parts by volume of benzene was refluxed for 4 hours at which time about 9.0 parts of water was collected in a Dean Stark trap. The product, p-methoxybenzylidene-p'-aminophenol was collected and recrystallized from a 50:50 by volume mixture of ethanol: benzene to give colorless crystals.

A mixture of 2.1 parts of the above crystals, 50 parts by volume of pyridine and 1.9 parts of 3-methylpentenoic anhydride was stirred for about one hour. The mixture was poured onto crushed ice, stirred and filtered with suction and the resulting filter cake recrystallized from isopropanol. Colorless crystals of p-methoxybenzylidene-p'-aminophenyl-3-methylpentanoate were obtained.

EXAMPLES 2–20

Other compounds of the invention were prepared in similar manner, except substituting the corresponding para-alkoxybenzylidene-p'-aminophenol and/or anhydride.

Examples of illustrative compounds of the invention are given in Table I below together with their crystal-nematic (C-N) transition temperatures and their nematic-isotropic liquid (N-L) transition temperatures. These compounds are mesomorphic or liquid crystalline in the temperature range between these two transition temperatures. It may be noted that it is possible for these compounds to be mesomorphic below the crystal-nematic transition temperature when supercooled. Also, some of the compounds exhibit a smetic phase.

TABLE I

| Example | Compound | C-N,°C. | N-L,°C. |
|---|---|---|---|
| 1 | p-methoxybenzylidene-p'-aminophenyl-3-methylpentanoate | 35–6 | 78 |
| 2 | p-methoxybenzylidene-p'-aminophenyl-3-methylbutanoate | 74 | 99–100 |
| 3 | p-methoxybenzylidene-p'-aminophenyl-4-methylpentanoate | 60.5 | 68 |
| 4 | p-methoxybenzylidene-p'-aminophenyl-5-methylhexanoate | 61 | 76 |
| 5 | p-methoxybenzylidene-p'-aminophenyl-3-methylhexanoate | 48–9 | 78 |
| 6 | p-ethoxybenzylidene-p'-aminophenyl-3-methylpentanoate | 59–60 | 103 |
| 7 | p-n-propoxybenzylidene-p'-aminophenyl-3-methylpentanoate | 71 | 83 |
| 8 | p-ethoxybenzylidene-p'-aminophenyl-5-methylhexanoate | 79–80 | 103 |
| 9 | p-n-propoxybenzylidene-p'-aminophenyl-5-methylhexanoate | 70–71 | 88 |
| 10 | p-n-butoxybenzylidene-p'-aminophenyl-3-methylpentanoate | 75 | 94 |
| 11 | p-n-pentoxybenzylidene-p'-aminophenyl-3-methylpentanoate | 75 | 85.5 |
| 12 | p-n-hexoxybenzylidene-p'-aminophenyl-3-methylpentanoate | 75–76 | 90 |
| 13 | p-n-heptoxybenzylidene-p'-aminophenyl-3-methylpentanoate | 77–78 | 87 |
| 14 | p-n-octoxybenzylidene-p'-aminophenyl-3-methylpentanoate | 77 * | 91 |
| 15 | p-n-butoxybenzylidene-p'-aminophenyl-5-methylhexanoate | 74–75 | 98 |
| 16 | p-n-pentoxybenzylidene-p'-aminophenyl-5-methylhexanoate | 75–77 | 88 |
| 17 | p-n-hexoxybenzylidene-p'-aminophenyl-5-methylhexanoate | 76–77 | 83 |
| 18 | p-n-heptoxybenzylidene-p'-aminophenyl-5-methylhexanoate | 74 ** | 88 |

TABLE I-continued

| Example | Compound | C-N,°C. | N-L,°C. |
|---|---|---|---|
| 19 | p-n-octoxybenzylidene-p'-aminophenyl-5-methylhexanoate | 69–70 | 82 |
| 20 | p-n-butoxybenzylidene-p'-aminophenyl-3-methylhexanoate | 62 | 90 |

* Smetic temperature 82°C.
** Smetic temperature 82°C.

EXAMPLES 21–43

Mixtures of compounds of the invention and their mixtures with other p-alkoxybenzylidene-p'-aminophenyl-alkanoates, which may or may not exhibit liquid crystal behavior alone, also exhibit liquid crystal behavior. Examples of representative mixtures are shown in Table II below.

TABLE II

Liquid crystal mixtures of compounds represented by the formula:

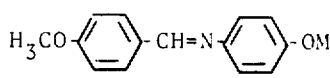

wherein M can be $M_1$ to $M_5$
where

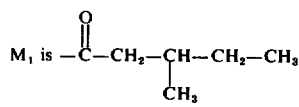

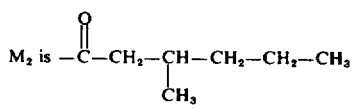

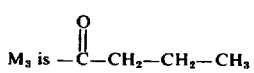

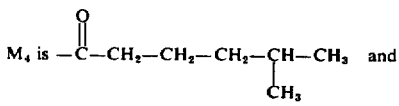

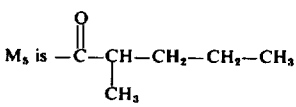

| Example | \multicolumn{5}{c}{MIXTURE, MOLE %} | C-N,°C. | N-L,°C. |
|---|---|---|---|---|---|---|---|
| | $M_1$ | $M_2$ | $M_3$ | $M_4$ | $M_5$ | | |
| 21 | 50 | 50 | — | — | — | 29–30 | 77 |
| 22 | — | 50 | 50 | — | — | 36 | 94–95 |
| 23 | 50 | — | 50 | — | — | 43 | 94–95 |
| 24 | 33 | 33 | 33 | — | — | 35.5 | 90 |
| 25 | 10 | 15 | 75 | — | — | 41–42 | 103–104 |
| 26 | 15 | 75 | 10 | — | — | 44 | 82 |
| 27 | 75 | 10 | 15 | — | — | 40 | 84 |
| 28 | 40 | 40 | 20 | — | — | 36.5 | 85 |
| 29 | 40 | 20 | 40 | — | — | 38 | 91.5 |
| 30 | 20 | 40 | 40 | — | — | 35 | 92 |
| 31 | 50 | 25 | 25 | — | — | 36 | 87 |
| 32 | 25 | 25 | 50 | — | — | 34.5 | 94.5 |
| 33 | 25 | 50 | 25 | — | — | 33.5 | 87 |
| 34 | 90 | — | — | 10 | — | 35 | 76 |
| 35 | 80 | — | — | 20 | — | 35 | 75.5 |
| 36 | 70 | — | — | 30 | — | 35 | 74–76 |
| 37 | 60 | — | — | 40 | — | 36.5 | 74–76 |
| 38 | 90 | — | — | — | 10 | 36 | 67–70 |
| 39 | 80 | — | — | — | 20 | 29–30 | 58–59 |
| 40 | 70 | — | — | — | 30 | 28.5 | 49–51 |
| 41 | 60 | — | — | — | 40 | 25 | 29 |
| 42 | 50 | — | — | — | 50 | 23 | 27.5–30.5 |
| 43 | 40 | — | — | — | 60 | <8 | 17–18.5 |

The lifetimes of liquid crystal light valves were tested in a nitrogen ambient atmosphere with a D.C. voltage of 30 volts applied across the liquid crystal layer. The light valves were kept at a temperature of 80°C. One cell tested consisted of a ½ mil. layer of p-methoxybenzylidene-p'-aminophenyl-3-methylpentanoate. Another cell consisted of a ½ mil. layer of p-methoxybenzylidene-p'-aminophenyl-5-methylhexanoate. After 3600 hours of continuous operation, the light scattering abilities of these cells were reduced by 50 percent and 75 percent respectively. These percentages are estimates from qualitative visual observation of the cells.

We claim:

1. An electro-optic device comprising a liquid crystal between electrical conductors, wherein the liquid crystal is a composition containing one or more compounds of the formula

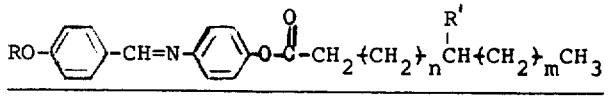

wherein R is a normal alkyl radical of 1–8 carbon atoms, R' is a normal alkyl radical of 1–6 carbon atoms, n and m are integers of 0–5 with the proviso that the acyloxy group $$\underset{OC}{\overset{O}{\|}} -CH_2\text{+}CH_2\text{+}_n\overset{R'}{\underset{|}{CH}}\text{+}CH_2\text{+}_mCH_3$$

contains up to 10 carbon atoms.

2. A device according to claim 1 wherein R and R' are alkyl radicals of 1–3 carbon atoms.
3. A device according to claim 2 wherein n is 0.
4. A device according to claim 3 wherein R and R' are methyl.
5. A device according to claim 1 wherein the liquid crystal composition additionally contains a compound of the formula

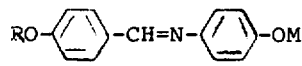

wherein R is a normal alkyl radical of 1–8 carbon atoms and OM is an acyloxy group of 4–10 carbon atoms.

6. A device according to claim 5 wherein OM is a branched-chain acyloxy group of 4–10 carbon atoms branched at the alpha carbon atom.
7. A device according to claim 1 wherein at least one of the electrical conductors is a transparent conductive film on a transparent support.
8. An electro-optic device comprising a liquid crystal layer between electrical conductors, at least one of which is a transparent conductive film on a transparent support, a substantial proportion of said liquid crystal layer consisting of a mixture of

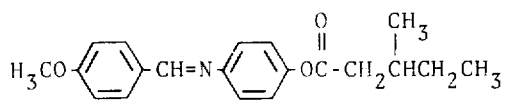

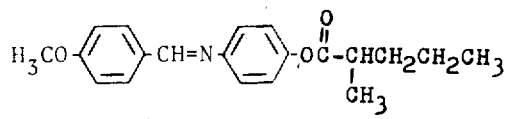

9. A liquid crystal composition consisting essentially of a mixture of one or more compounds having the formula

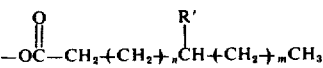

wherein R is a normal alkyl radical of 1–8 carbon atoms, R' is a normal alkyl radical of 1–6 carbon atoms, $n$ and $m$ integers of 0–5 with the improviso that the acyloxy group

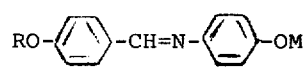

contains up to 10 carbon atoms and a compound having the formula (b)  $RO-\langle\rangle-CH=N-\langle\rangle-OM$ wherein R is a normal alkyl radical of 1–8 carbon atoms and OM is an acyloxy group of 4–10 carbon atoms.

10. A composition according to claim 9 wherein OM is a branched-chain acyloxy group of 4–10 carbon atoms branched at the alpha carbon atom.

* * * * *

UNITED STATES PATENT OFFICE
CERTIFICATE OF CORRECTION

PATENT NO. : 3,925,236
DATED : December 9, 1975
INVENTOR(S) : Joel Edward Goldmacher et al.

It is certified that error appears in the above-identified patent and that said Letters Patent are hereby corrected as shown below:

Column 1, line 66, change "R" to -- R' are --.

Column 2, line 37, after "p'" insert a dash (-).

Column 8, line 4, change "improvise" to -- proviso --.

Signed and Sealed this twentieth Day of April 1976

[SEAL]

Attest:

RUTH C. MASON
Attesting Officer

C. MARSHALL DANN
Commissioner of Patents and Trademarks